July 24, 1956 A. MURRAY 2,756,143

PHOTOGRAPHIC REPRODUCTION PROCESS

Filed Dec. 24, 1953

ALEXANDER MURRAY
INVENTOR.

BY Daniel J. Mayne
W. H. McDowell
ATTORNEY & AGENT

United States Patent Office 2,756,143

Patented July 24, 1956

2,756,143

PHOTOGRAPHIC REPRODUCTION PROCESS

Alexander Murray, Rochester, N. Y., assignor to Eastman Kodak Company, Rochester, N. Y., a corporation of New Jersey Application December 24, 1953, Serial No. 400,247

8 Claims. (Cl. 95—5.4)

Figures 1, 2:
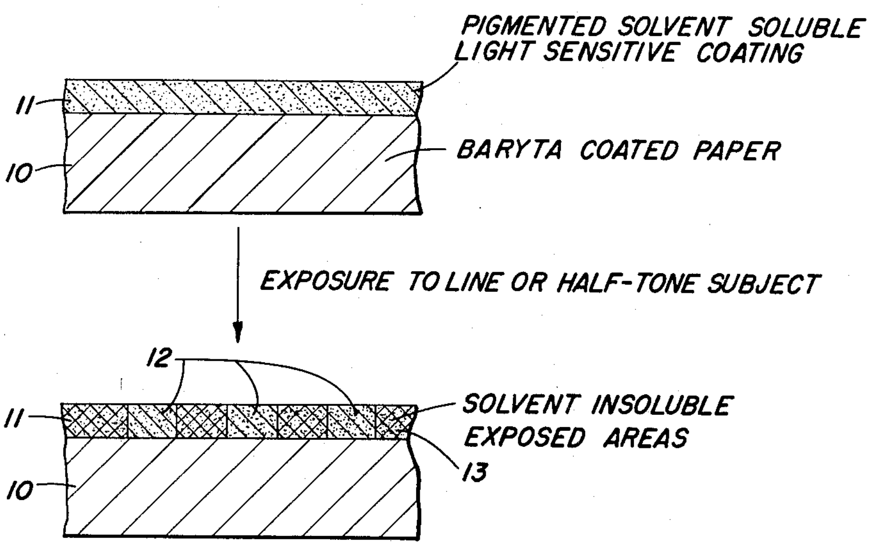

This invention relates to a photographic reproduction process which involves the exposure of a light-sensitive organic solvent-soluble layer under a line or halftone subject so as to insolubilize the layer in the region of exposure, followed by moistening the exposed layer with organic solvent and transferring a portion of the unexposed area to a receiving sheet by imbibition, as well as photolithographic uses of this process.

In the accompanying drawings is shown diagrammatically a method for carrying out my invention.

The light-sensitive organic solvent-soluble materials which are applicable to use in my invention include a wide variety of materials which are preferably but not necessarily polymeric materials. Examples of the typical useful materials include the cinnamic acid esters of polyvinyl alcohol and cellulose, the preparation of which is described in the Minsk et al U. S. patent application Serial Nos. 207,048 and 207,052, now U. S. Patents 2,690,966 and 2,725,372, respectively, filed January 20, 1951, e. g., polyvinyl cinnamate (polyvinyl alcohol esterified to the extent of from about 60 to 100 percent with cinnamoyl chloride and thus containing from about 60 to 100 mol percent of the recurring units

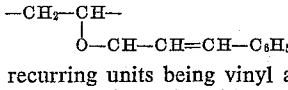

the remaining recurring units being vinyl alcohol units), the comparable o-chlorocinnamic acid esters of polyvinyl alcohol, m-nitro cinnamic acid esters of polyvinyl alcohol and α-phenyl-cinnamic acid esters of polyvinyl alcohol; benzal-ar-vinylacetophenone and cinnamal-ar-vinylacetophenone polymers prepared as described in the Unruh et al. U. S. patent applications Serial Nos. 246,515–17, now U. S. Patents 2,716,102; 2,716,097 and 2,706,725, respectively, filed September 13, 1951.

The cinnamal-ar-vinylacetophenone polymers (otherwise known as cinnamalcetylstyrene polymers) contain recurring units having the general formula

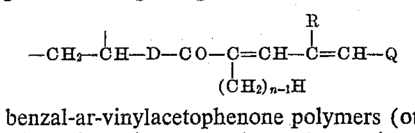

and the benzal-ar-vinylacetophenone polymers (otherwise known as benzalacetylstyrene polymers) contain recurring units having the general formula

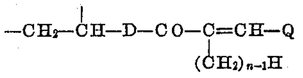

in which D represents a monocyclic arylene group of the benzene series, $n$ is 1 to 4 and Q is a monocyclic aryl group of the benzene series, for example, polymers of: cinnamalacetylstyrene, α-n-amylcinnamalacetylstyrenes, p-chlorocinnamalacetylstyrene, m-nitrocinnamalacetylstyrene, o-chlorocinnamalacetylstyrene, p-methoxycinnamalacetylstyrene, p-methylcinnamalacetylstyrene, p-chlorocinnamalacetyl-o-methoxystyrene, p-methoxycinnamalacetyl-o-methoxystyrene, benzalcinnamalacetylstyrene, cinnamalmethylvinyl-ketone, isopropylbenzalacetylstyrene, p-hydroxybenzalacetylstyrene, p-dimethylamino-acetylstyrene, o-chlorobenzalacetylstyrene, p-acetamidobenzalacetylstyrene, p-sulfobenzalacetylstyrene, anisal-acetylstyrene, veratralacetylstyrene, anisalacetyl-o-methoxystyrene, p-hydroxybenzalacetyl-o-methoxystyrene, o-chlorobenzalacetyl-o-chlorostyrene, p-chlorobenzalacetyl-2,5-dimethylstyrene, anisal-acetyl-p-phenoxystyrene, anisalacetyl-p-bromostyrene, tolualacetyl-3,4-dimethoxystyrene, anisalacetyl-o-fluorostyrene, α-naphthal-acetylstyrene, anisalbenzalacetylstyrene, anisalvinylmethyl ketone, benzalacetylstyrene, benzalacetyl-o-methoxystyrene, benzalacetyl-o-, m-, p-chlorostyrenes, benzalacetyl-o-, m-, p-bromostyrenes, benzalacetyl-p-benzylstyrene, benzalacetyl-p-phenoxystyrene, benzalacetyl-3,4-dichlorostyrene, benzalacetyl-2,5-dimethylstyrene, benzalacetyl-m-methylstyrene, benzalacetyl-m-tert.-butylstyrene, benzalacetyl-3,4-dihydroxystyrene. Other useful light-sensitive materials are the cinnamoylated polystyrenes such as those disclosed in the Allen et al. U. S. Patent 2,566,302, September 4, 1951; hydroxyalkyl cellulose cinnamates described in the Minsk et al. U. S. patent application Serial No. 308,284, now abandoned, filed September 6, 1952, e. g., hydroxyethyl cellulose cinnamate; "alketone" compositions, e. g., containing anisalcinnamalacetone, dicinnamalacetone, furfuralacetophenone, cinnamalacetophenone, dicinnamalcyclohexanone, difurfuralcyclopentanone such as described in U. S. Patents 1,965,710, and 2,091,715.

Coatings of the sensitive materials indicated above such as the cinnamic acid esters of polyvinyl alcohol, the ar-vinyl-benzalacetophenone polymers, the ar-vinylcinnamalacetophenone polymers and the hydroxyalkyl cellulose cinnamates can be sensitized with nitro compounds, triphenylmethane, anthrone, quinone, and ketone compounds, such as nitroanilines, Crystal Violet carbinol base, 1-carbethoxy-2-keto-3-methyl-3-azabenzanthrone, 1,2-benzanthraquinone, 4,4′-tetramethyldiaminodiphenyl ketone, disclosed in the U. S. Patent 2,610,120 and in Minsk et al. U. S. patent applications Serial Nos. 207,048–51, now U. S. Patents 2,690,966 and 2,670,285–7, respectively, filed January 21, 1951, and Serial No. 308,284, filed September 6, 1952, as well as the thiazole compounds of the Robertson et al. U. S. patent application Serial No. 314,806, filed October 15, 1952, such as 2-benzoylmethylene-1-methyl-β-naphthothiazoline.

The above representative light-sensitive materials may be coated from a variety of solvents upon a variety of supports for use in my process. An excellent support is ordinary baryta-coated photographic paper base which has been given a light gelatin size coating of the order of 0.225 gram of gelatin per square foot. Flexible supports are particularly desirable when the transfer operation to be described in more detail hereinafter is carried out by means of plate and impression cylinders. Solvents for coating the sensitive materials can be selected from an extensive group of solvents including hydrocarbon solvents such as benzene, toluene and xylene, esters such as ethylene glycol ether acetate, ketones such as methyl ethyl ketone, chlorinated hydrocarbons such as ethylene dichloride, chlorobenzene, trichloroethylene and mixtures of these solvents.

After exposure of the sensitive coating to the selected line or halftone image (so-called two-tone images), a solvent such as those indicated above, for example, methyl ethyl ketone or a mixture of two parts of ethylene dichloride and one part of xylene, is applied to the exposed surface of the light-sensitive coating so as to moisten it and put into solution a thin stratum of the unexposed area of the coating, and very quickly thereafter the moist surface of the exposed coating is pressed into intimate contact with an absorbent receiving surface with the result that the dissolved portion of the exposed area of the coating transfers to the receiving sheet. By repeated application of solvent to the original exposed layer and pressing it into contact with other receiving sheets, a multiplicity of prints can be obtained from the exposed element. Obviously, the transferred image is not readily visible if it comprises only the unexposed light-sensitive material. Accordingly, coloring materials including dyes and pigments are incorporated into the original light-sensitive compositions before coating them on a support. Suitable coloring materials are carbon black, Ultramarine Blue and Nigrosine dyes. A mixture of carbon black and Ultramarine Blue is especially useful.

It will be apparent that when the solvent is applied to the exposed element preparatory to the printing operation, it must be applied to the surface of the exposed layer and not to the back of the support carrying the exposed layer since in the latter case the entire unexposed areas of the light-sensitive layer tend to separate from the support and a very unsatisfactory image is obtained on the receiving sheet. Moreover, by this method a multiplicity of copies is not obtainable.

The sheet or surface which is pressed against the exposed and solvent-moistened light-sensitive layer should be capable of absorbing the solvent solution of the image to be transferred without undue lateral diffusion. For this purpose, a wide variety of surfaces are useful such as wood, paper, cloth and metal. The less porous surfaces are most useful when a multiplicity of prints are to be made, for example, highly sized paper and including baryta-coated photographic papers. Useful results can be obtained by using as a receiving surface grained or ungrained metal such as grained or ungrained zinc and aluminum.

A particular application of our process is to the preparation of lithographic printing plates. To this end, the exposed and solvent-moistened light-sensitive layer is pressed onto a conventional hydrophilic lithographic printing surface such as the so-called Duplimat master printing sheets as well as pigmented casein, gelatin and polyvinyl alcohol surfaces as well as surface-hydrolyzed cellulose ester films. The prints obtained on such surfaces are composed of the pigmented light-sensitive material, are highly receptive of greasy printing inks used in lithography, and may be inked up and printed on a lithographic printing press. Similar results are obtained when the exposed and solvent-treated sensitive layers are printed onto metal surfaces such as aluminum, either untreated, or silicate treated or zincated, or zinc surfaces, followed by application of conventional gum-free "desensitizing etch" solutions containing, for example, phosphoric acid to render moisture-receptive the areas of the metal plate not occupied by the ink-receptive image.

The prints obtained by pressing the exposed and solvent-treated light-sensitive layers into contact with metal surfaces such as zinc, copper, magnesium and aluminum may also serve as etching resists in which case conventional etching solutions are applied by well known methods to provide etched metal line and halftone printing plates.

My invention may be further understood from consideration of the following detailed description with particular reference to the accompanying drawings:

*Example 1*

A coating composition was prepared of 100 grams of fully esterified polyvinyl cinnamate in one liter of ethylene glycol monomethyl ether acetate to which was added five grams of carbon black, 100 grams of Ultramarine Blue and five grams of 4,4'-tetramethyldiaminodiphenyl ketone sensitizer. The dope was coated onto baryta-coated photographic paper stock having on the coating surface a size coating of 0.225 gram of gelatin per square foot, at a coverage of 10.6 grams of dope per square foot or 1.823 grams of solids per square foot. The sensitive element thus prepared is shown in Fig. 1 of the accompanying drawings wherein layer 10 represents the paper stock carrying the pigmented layer of light-sensitive polymer 11.

The sensitive element is then exposed to a line or halftone positive, for example, for 2½ minutes at three feet from a 35-ampere Macbeth white flame arc. After exposure, the element contains areas 12 still soluble in organic solvent, the remaining areas 13 of layer 11 having been insolubilized by exposure to light as shown in Fig. 2 of the drawings.

The element of Fig. 2 is now ready for printing onto the selected receiving surface such as a well-sized paper stock. This can be accomplished in an apparatus such as shown diagrammatically in Fig. 3 of the drawings wherein the exposed element of Fig. 2 is shown as being moistened by a bead of solvent, such as methyl ethyl ketone or a mixture of ethylene dichloride and xylene, supplied to the solvent roller by the solvent fountain and applied from the solvent roller to the exposed surface of the sensitive element. Thence, the solvent-moistened paper passes clockwise around the plate cylinder meeting the paper-receiving sheet or web between the plate cylinder and the impression cylinder so as to make one impression per second with the result that as web 14 emerges from between the cylinders, it separates from the solvent-treated element and carries with it a portion of the unexposed polymeric areas substantially as shown.

In a similar manner, differently colored layers of the light-sensitive materials mentioned may be exposed respectively to color-separation aspects of a subject, placed in register on a plate cylinder and successively printed on a single receiving sheet to obtain a full-color reproduction.

*Example 2*

Figure 3:
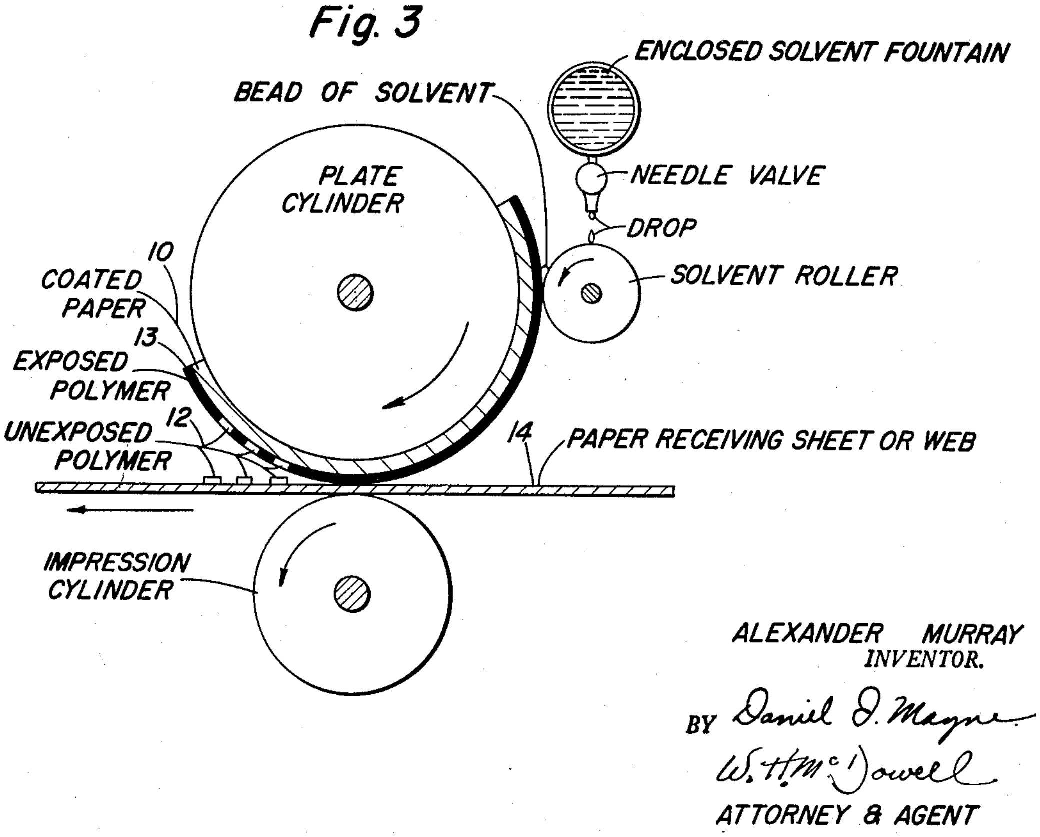

In adapting my process to making a lithographic print, a weakly dyed dope was prepared from 10 grams of polyvinyl cinnamate, 1.5 grams of Nigrosine Jet Black dye, 100 cc. furfural and 1 gram of 2-benzoylmethylene-1-methyl-β-naphthothiazoline. The dope was whirl-coated at 80 R. P. M. onto baryta-coated paper stock which had been previously sized with 0.225 gram of gelatin per square foot. After exposure through a halftone or line positive for 5 minutes at 3 feet from a 35-ampere Macbeth white flame arc, the exposed coating was moistened with solvent and printed as shown in Fig. 3 of the drawings onto a hydrophilic duplicating receiving sheet such as a pigmented casein-coated paper. The image obtained on the receiving sheet was very ink-receptive while the non-image parts of the receiving sheet remained hydrophilic. The plate was printed on a Multilith duplicating machine to obtain positive prints.

What I claim is:

1. A photographic reproduction process which comprises exposing to a two-toned subject a supported layer of a light-sensitive organic solvent-soluble material capable of being insolubilized by exposure to light selected from the class consisting of cinnamic acid esters of polyvinyl alcohol and cellulose, benzal-ar-vinylacetophenone polymers, cinnamal-ar-vinylacetophenone polymers, cinnamoylated polystyrenes, cinnamic acid esters of hydroxyalkylated cellulose, and cinnamal ketones, thereby insolubilizing the layer only in the region of exposure, moistening the surface of the exposed layer with an organic solvent for said material, pressing an absorbent receiving surface into contact with the solvent moistened surface and removing the receiving surface from the solvent moistened surface to obtain on the receiving surface, as an image of the subject, a portion of the unexposed areas of the layer.

2. The process of claim 1 wherein the light-sensitive material is a cinnamic acid ester of polyvinyl alcohol.

3. The process of claim 1 wherein the light-sensitive material is a benzal-ar-vinylacetophenone polymer.

4. The process of claim 1 wherein the receiving surface is a hydrophilic surface capable of repelling greasy printing inks when moistened with water.

5. The process of claim 1 wherein the receiving surface is paper and the light-sensitive material is polyvinyl cinnamate.

6. A lithographic printing process which comprises exposing to a two-toned subject a supported layer of a light-sensitive organic solvent soluble material capable of being insolubilized by exposure to light selected from the class consisting of cinnamic acid esters of polyvinyl alcohol and cellulose, benzal-ar-vinylacetophenone polymers, cinnamal-ar-vinylacetophenone polymers, cinnamolylated polystyrenes, cinnamic acid esters of hydroxyalkylated cellulose, and cinnamal ketones, thereby insolubilizing the layer only in the region of exposure, moistening the surface of the exposed layer with an organic solvent for said soluble material, pressing a hydrophilic organic colloid receiving sheet into contact with the solvent moistened surface, removing the receiving sheet from the solvent moistened surface to obtain on the receiving sheet as an image of the subject a stratum of the unexposed colloid of the layer, applying a greasy printing ink to said stratum of unexposed colloid, and printing therefrom in a lithographic printing press.

7. The process of claim 6 wherein the light-sensitive material is a cinnamic acid ester of polyvinyl alcohol.

8. The process of claim 6 wherein the light-sensitive material is a benzal-ar-vinylacetophenone polymer.

References Cited in the file of this patent

UNITED STATES PATENTS

| | | |
|---|---|---|
| 1,118,479 | Dodge | Nov. 24, 1914 |
| 1,574,356 | Beebe | Feb. 23, 1926 |
| 1,618,505 | Beebe | Feb. 22, 1927 |
| 2,596,756 | Yutzy et al. | May 13, 1952 |